(12) United States Patent
Boloorian et al.

(10) Patent No.: US 11,378,692 B2
(45) Date of Patent: Jul. 5, 2022

(54) LIDAR SYSTEM WITH POLARIZATION DIVERSITY

(71) Applicant: SiLC Technologies, Inc., Monrovia, CA (US)

(72) Inventors: Majid Boloorian, San Diego, CA (US); Bradley Jonathan Luff, La Canada Flintridge, CA (US); Mehdi Asghari, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 375 days.

(21) Appl. No.: 16/562,402

(22) Filed: Sep. 5, 2019

(65) Prior Publication Data

US 2021/0072389 A1 Mar. 11, 2021

(51) Int. Cl.
*G01C 3/08* (2006.01)
*G01S 17/88* (2006.01)
*G01S 17/02* (2020.01)
*G01S 7/4914* (2020.01)
*G01S 7/481* (2006.01)

(52) U.S. Cl.
CPC ............ *G01S 17/88* (2013.01); *G01S 7/4914* (2013.01); *G01S 17/02* (2013.01); *G01S 7/4816* (2013.01)

(58) Field of Classification Search
CPC ........ G01S 17/88; G01S 17/02; G01S 7/4914; G01S 7/4816
See application file for complete search history.

(56) References Cited

U.S. PATENT DOCUMENTS

2019/0339389 A1\* 11/2019 Russo ..................... G01S 17/42

FOREIGN PATENT DOCUMENTS

WO   WO 2015044370 A1 \*  4/2015   ............. G01S 17/58

\* cited by examiner

*Primary Examiner* — Mark Hellner
(74) *Attorney, Agent, or Firm* — Gavrilovich, Dodd & Lindsey LLP (57) ABSTRACT

The system also includes components that combine contributions from different signals so as to generate composite signals that each carries the LIDAR data. Each composite signal is associated with a polarization state and is also a signal component selected from a quadrature component and an in-phase component. Each of the composite signals is associated with a different combination of polarization state and signal component. The system also includes electronics that combine the composite signals so as to generate an in-phase component of a complex LIDAR data signal and a quadrature component of the LIDAR data signal. The electronics extract the LIDAR data from the complex LIDAR data signal.

18 Claims, 5 Drawing Sheets

LIDAR SYSTEM WITH POLARIZATION DIVERSITY

FIELD

The invention relates to optical devices. In particular, the invention relates to LIDAR systems.

BACKGROUND

LIDAR technologies are being applied to a variety of applications such as self-driving cars and facial recognition. LIDAR systems typically output light signals that are reflected by an object in the path of the light signals. The reflected light carries LIDAR data and returns to the LIDAR system. The LIDAR system processes the returned light so as to extract the LIDAR data such as the radial velocity and/or distance between the object and the LIDAR system.

LIDAR systems typically use lasers as the source of the light signals output by the LIDAR system. Since laser light is typically linearly polarized, the light signals output from the LIDAR systems is typically polarized. Reflection of polarized light signals by the object can change the angle of polarization of the reflected light. Accordingly, light returning to the LIDAR system from the object can include light of multiple different linear polarization states. The presence of the different polarization states can cause the LIDAR system to lose the LIDAR data carried by the returning light.

Additionally, the performance of LIDAR systems can be improved through the use of complex electrical signals that carry the LIDAR data. However, combining the use of complex electrical signals with compensation of polarization state diversity rapidly increases the number of electrical components that are required for successful operation of the LIDAR system. This increase in components increases the cost and complexity of the LIDAR system. As a result, there is a need for LIDAR system that uses complex electrical signals to carry LIDAR data and compensates for polarization diversity.

SUMMARY

A system outputs a LIDAR output signal toward a sample region in a field of view. The LIDAR output signal includes light from an outgoing LIDAR signal that is guided by the system. The system also receives a LIDAR input signal that has been reflected by an object located outside of the LIDAR system. The LIDAR input signal includes light from the LIDAR output signal. The system also combines contributions from different signals so as to generate composite signals that each carries LIDAR data. Each of the composite signals has a contribution from the LIDAR input signal and also has a contribution from a portion of the outgoing LIDAR signal that was not output from the LIDAR system. Each composite signal is associated with a polarization state and is also a signal component selected from a quadrature component and an in-phase component of a complex signal. Each of the composite signals is associated with a different combination of polarization state and signal component. The system also includes electronics that combine the composite signals so as to generate an in-phase component of a complex LIDAR data signal and a quadrature component of the LIDAR data signal. The electronics extract the LIDAR data from the complex LIDAR data signal.

A method of operating a LIDAR system includes outputting a LIDAR output signal toward a sample region in a field of view. The LIDAR output signal includes light from an outgoing LIDAR signal guided by the system. The method also includes receiving a LIDAR input signal that has been reflected by an object located outside of the LIDAR system and within the sample region. The LIDAR input signal includes light from the LIDAR output signal. The method also includes combining contributions from different signals so as to generate composite signals that each carries LIDAR data that indicates a radial velocity and/or distance between the object and the LIDAR system. Each composite signal has a contribution from the LIDAR input signal and also have a contribution from a portion of the outgoing LIDAR signal that was not output from the LIDAR system. Each of the composite signals is associated with a polarization state in that the contribution of the LIDAR input signal to the composite signal was of the associated polarization state. Also, each composite signal is associated with a signal component of a complex signal in that each composite signal is a signal component selected from the group consisting of an in-phase component and a quadrature component. Each of the composite signals is associated with a different combination of polarization state and signal component. The method also includes combining the composite signals so as to generate an in-phase component of a complex LIDAR data signal and a quadrature component on the LIDAR data signal. The method further includes extracting the LIDAR data from the complex LIDAR data signal.

DESCRIPTION

A LIDAR system outputs a LIDAR output signal toward a sample region in a field of view. An object in the sample region reflects at least a portion of the LIDAR output signal back toward the LIDAR system. The reflected light is received by the LIDAR system as a LIDAR input signal. The reflection of light by the object can cause at least a portion of the light to change polarization state. As a result, the LIDAR input signal can include light in multiple polarization states.

The LIDAR system combines contributions from multiple different signals so as to generate multiple complex data signals that each includes an in-phase component and a quadrature component. Each of the complex data signals carries LIDAR data indicating a radial velocity and/or speed between the LIDAR system and the object. Part of extracting the LIDAR data from the data signals typically includes identifying the frequency of the LIDAR input signal through the use of a mathematical transform such as a Fourier transform. When non-complex data signals are used, there are multiple possible solutions to the frequency. As a result, the use of complex data signals provides a non-ambiguous resolution to this frequency and accordingly provides non-ambiguous LIDAR data.

Additionally, each of the complex data signals is associated with a different polarization state in that a contribution to the complex data signal is a portion of the LIDAR input signal having the polarization state associated with the complex data signal. The use of data signals carrying data from different polarization states reduces loss of data due to changes in polarization state in response to reflection of the LIDAR output signals.

The complex data signals can be processed individually to extract the LIDAR data; however, the number of electrical components needed to accurately extract the LIDAR data can expand quickly increasing both the cost and complexity of the LIDAR system. One embodiment of the LIDAR system includes electronics that combine the complex data signals so as to form a complex LIDAR data signal. The LIDAR data is then extracted from the complex LIDAR data signal rather than from multiple complex data signals. This combination of the complex data signals before extraction of the LIDAR data reduces the number of electrical components needed to accurately extract the LIDAR data. As a result, the disclosed LIDAR system provides practical extraction of LIDAR data with reduced ambiguity while also reducing data losses resulting from changes in polarization state.

Figure 1:
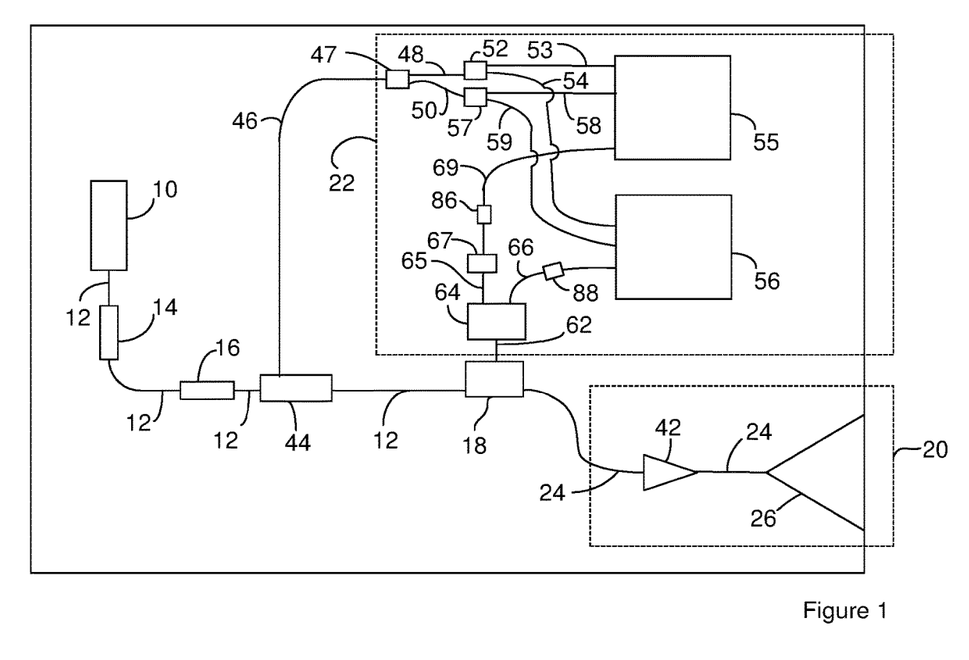
FIG. 1 is a schematic of a LIDAR chip suitable for use in a LIDAR system.

FIG. 1 is a schematic of a LIDAR system. The system includes a light source 10 such as a laser that outputs an outgoing light signal. The LIDAR system also includes a utility waveguide 12 that receives an outgoing light signal from the light source 10. A modulator 14 is optionally positioned along the utility waveguide 12. The modulator 14 is configured to modulate the power of the outgoing light signal and accordingly a LIDAR output signals that are output from the LIDAR system. Electronics can operate the modulator 14. Accordingly, the electronics can modulate the power of the outgoing LIDAR signal and accordingly the LIDAR output signals. Suitable modulators 14 include, but are not limited to, PIN diode carrier injection devices, Mach-Zehnder modulator devices, and electro-absorption modulator devices. When the modulator 14 is constructed on a silicon-on-insulator platform, a suitable modulator is disclosed in U.S. patent application Ser. No. 617,810, filed on Sep. 21, 1993, entitled Integrated Silicon PIN Diode Electro-Optic Waveguide, and incorporated herein in its entirety.

An amplifier 16 is optionally positioned along the utility waveguide 12. Suitable amplifiers include, but are not limited to, semiconductor optical amplifiers (SOAs).

The utility waveguide 12 carries the outgoing light signal to a signal-directing component 18. The signal-directing component 18 can direct the outgoing light signal to a LIDAR branch 20 and/or a data branch 22. The LIDAR branch outputs LIDAR output signals and receives LIDAR input signals. The data branch processes the LDAR input signals so as to extract LIDAR data (distance and/or radial velocity between the source of the LIDAR output signal and a reflecting object).

The LIDAR branch includes a LIDAR signal waveguide 24 that receives at least a portion of the outgoing light signal from the signal-directing component 18. The LIDAR signal waveguide 24 carries at least a portion of the outgoing light signal to an output component 26. The output component 26 outputs the LIDAR output signals which can be reflected by a reflecting object (not shown) located outside of the LIDAR system. The reflected LIDAR output signals return to the output component 26 as LIDAR input signals. The output component 26 receives the LIDAR input signal and outputs the result on the LIDAR signal waveguide 24 as an incoming light signal.

In some instances, the output component 26 also includes beam steering functionality. In these instances, the output component 26 can be in electrical communication with electronics (not shown) that can operate the output component 26 so as to steer the LIDAR output signals to different sample regions in a field of view.

Although the output component 26 is illustrated as a single component, the output component 26 can include multiple optical components and/or electrical components. Suitable output components 26 include, but are not limited to, optical phased arrays (OPAs), transmission diffraction gratings, reflection diffraction gratings, and Diffractive Optical Elements (DOE). Suitable output components 26 with beam steering capability include, but are not limited to, optical phased arrays (OPAs) with active phase control elements on the array waveguides.

The LIDAR signal waveguide 24 carries the incoming light signal from the output component 26 back to the signal-directing component 18. The signal-directing component 18 directs the incoming light signal to the utility waveguide 12 and/or an intermediate waveguide 62. The portion of the incoming light signal-directed to the intermediate waveguide 62 serves a comparative incoming light signal.

A tap component 44 is positioned along the utility waveguide 12. The tap component 44 is configured to tap off a portion of the outgoing light signal such that the portion of the outgoing light signal is received on a reference signal waveguide 46. The reference signal waveguide 46. The reference signal waveguide 46 carries the portion of the outgoing light signal to a reference splitter 47 that divides the portion of the outgoing light signal into a first portion of the reference signal that is received on a first shift waveguide 48 and a second portion of the reference signal that is received on a second shift waveguide 50. Suitable reference splitters 47 include, but are not limited to, star couplers, Y-junctions and 1×2 MMI couplers.

The first shift waveguide 48 carries the first portion of the reference signal to a first reference splitter 52 that divides the first portion of the reference signal into a first reference signal that is received on a first reference waveguide 53 and a second reference signal that is received on a second reference waveguide 54. The first reference waveguide 53 carries the first reference signal to a first processing component 55. The second reference waveguide 54 carries the second reference signal to a second processing component 56. Suitable first reference splitters 52 include, but are not limited to, star couplers, Y-junctions and 1×2 MMI couplers.

The second shift waveguide 50 carries the second portion of the reference signal to a second reference splitter 57 that divides the second portion of the reference signal into a first secondary reference signal that is received on a first secondary reference waveguide 58 and a second secondary reference signal that is received on a second secondary reference waveguide 59. The first secondary reference waveguide 58 carries the first secondary reference signal to the first processing component 55. The second secondary reference waveguide 59 carries the second component reference signal to the second processing component 56. Suitable second reference splitters 57 include, but are not limited to, star couplers, Y-junctions and 1×2 MMI couplers.

The optical pathlengths provided by the waveguides can be selected to provide a first phase shift between the phase of the first reference signal at the exit of the first reference waveguide 53 and the phase of the first secondary reference signal at the first secondary reference waveguide 58; and also to provide a second phase shift between the phase of the second reference signal at the exit of the second reference waveguide 54 and the phase of the second secondary reference signal at the exit of the second secondary reference waveguide 59. For instance, the length of the first shift waveguide 48, second shift waveguide 50, first reference waveguide 53, the second reference waveguide 54, the first secondary reference waveguide 58 and the second secondary reference waveguide 59 can be selected to provide the desired first phase shift and the desired second phase shift.

The first phase shift can be the same as or different from the second phase shift. In one example, the first phase shift is equal to (n*360°+90°) and the second phase shift is equal to) (n'*360°+90°) where n is an integer that can be zero, positive, or negative and n' is an integer that can be zero, positive, or negative. This configuration effectively provides a 90° first phase shift and a 90° second phase shift. As a result, the first reference signal and the first secondary reference signal can be the in-phase components of a first complex reference signal and the second reference signal and the second secondary reference signal can be the quadrature components of a second complex reference signal. For the following discussion, the first reference signal is an in-phase component of a first complex reference signal, the first secondary reference signal is the quadrature component of the first complex reference signal, the second reference signal is an in-phase component of a second complex reference signal, the second secondary reference signal is the quadrature component of the second complex reference signal.

In one example, the desired first phase shift and second phase shift is achieved when the first shift waveguide 48 and the second shift waveguide 50 have different lengths that provide the desired phase shifts while each pair of waveguides selected from the group consisting of the first reference waveguide 53, the second reference waveguide 54, the first secondary reference waveguide 58 and the second secondary reference waveguide 59 has a length differential of m*λ where λ is the wavelength of the LIDAR output signal in the waveguide and m is an integer that can be zero, positive, or negative and the value of m can be different or the same for each possible pair of waveguides. In one example, m is zero for each possible pair of waveguides. In another example, the desired first phase shift and second phase shift is achieved when the first shift waveguide 48 and the second shift waveguide 50 have lengths that differ by m*λ where λ is the wavelength of the LIDAR output signal in the waveguide and m is an integer that can be zero, positive, or negative and the value of m can be different or the same for each pair of waveguides; the first reference waveguide 53 and the first secondary reference waveguide 58 have different lengths that provide the desired first phase shift; and second first reference waveguide 54 and the second secondary reference waveguide 59 have different lengths that provide the desired second phase shift.

The intermediate waveguide 62 carries the comparative incoming light signal from the signal-directing component 18 to a beamsplitter 64. The beamsplitter 64 splits the comparative incoming light signal into a precursor comparative incoming signal and a second comparative incoming signal. The precursor comparative incoming signal is received on a precursor comparative signal waveguide 65 and the second comparative incoming signal is received on a second comparative signal waveguide 66. The second comparative signal waveguide 66 carries the second comparative incoming signal to the second processing component 56. The precursor comparative signal waveguide 65 carries the precursor comparative incoming signal to a polarization rotator 67. The polarization rotator outputs a first comparative signal that is received on a first comparative signal waveguide 69. The first comparative signal waveguide 69 carries the first comparative signal to the first processing component 55.

The LIDAR system is constructed such that the first comparative signals have the same polarization angle as the corresponding second comparative signals. For instance, the beamsplitter 64 can be a polarizing beam splitter. One example of a polarizing beamsplitter is constructed such that the precursor comparative incoming signal has a first polarization state but do not have or do not substantially have a second polarization state and the second comparative incoming signal has a second polarization state but does not have or does not substantially have the first polarization state. For instance, the polarizing beamsplitter can route a portion of the incoming light signal having the first polarization state to the precursor comparative signal waveguide 65 and a portion of the incoming light signal having the second polarization state to the second comparative signal waveguide 66. The first polarization state and the second polarization state can be linear polarization states and the second polarization state is different from the first polarization state. For instance, the first polarization state can be TE and the second polarization state can be TM or the first polarization state can be TM and the second polarization state can be TE. Suitable beamsplitters include, but are not limited to, Wollaston prisms, MEMs-based polarizing beamsplitters and integrated optical polarizing beamsplitters using asymmetric y-branches, Mach-Zehnder interferometers and multi-mode interference couplers.

The polarization rotator can be configured to change the polarization state of the precursor comparative incoming signal from the first polarization state to the second polarization state. As a result, the first comparative signal has the second polarization state but does not have or does not substantially have the first polarization state. Since the second comparative signal has the second polarization state and the polarization state is not rotated, the first comparative signal and the second comparative signal each has the same polarization state (the second polarization state in this discussion). Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Despite the first comparative signal and the second comparative signal having the same polarization state, the first comparative signal is associated with a different polarization state from the polarization state of the second comparative signal. For instance, due to presence of the beamsplitter 64, the first comparative signal carries LIDAR data that was returned to the LIDAR system by light with the first polarization state but the second comparative signal carries LIDAR data that was returned to the LIDAR system by light with the second polarization state. As a result, the first comparative signal carries the LIDAR data from the portion of the LIDAR input signal having the first polarization state and the second comparative signal carries the LIDAR data from the portion of the LIDAR input signal having the second polarization state. Accordingly, the first comparative signal is associated with the first polarization state while the second comparative signal is associated with the second polarization state.

Since the LIDAR output signal is linearly polarized, the first reference signal, the first secondary reference signal, the first comparative signal and the second comparative signal can each have the same polarization state. In this example, the first comparative signals, the second comparative signals, the first reference signals, and the second reference signals can each have light of the second polarization state.

In some instances, an optical amplifier 42 is optionally positioned along the LIDAR signal waveguide 24 and is configured to provide amplification of the outgoing light signal and/or of the incoming light signal. Accordingly, the effects of optical loss at the signal-directing component 18 can be reduced.

A phase shifter can optionally be positioned along the second comparative signal waveguide 66 and/or the first comparative signal waveguide 69. For instance, FIG. 1 illustrates a first phase shifter 86 positioned along the first comparative signal waveguide 69 and a second phase shifter 88 positioned along the second comparative signal waveguide 66. When the LIDAR system includes a first phase shifter 86 and/or a second phase shifter 88, the electronics can operate the first phase shifter 86 and/or a second phase shifter 88 so as to retain the desired incoming phase differential between the phase of the first comparative incoming signal at the end of the first comparative signal waveguide 69 and the phase of the second comparative incoming signal at the end of the second comparative signal waveguide 66. In some instances, the electronics operate the first phase shifter 86 and/or the second phase shifter 88 so as to retain the desired incoming phase differential of $k*2*\pi$ where k is an integer that can be zero, negative, or positive. As a result, the optical pathlength provided by the first comparative signal waveguide 69 and the second comparative signal waveguide 66 can be different by $n*\lambda$ where $\lambda$ is the wavelength of the LIDAR output signal in the waveguide and n is an integer that can be zero, positive, or negative. In this configuration, there is not an incoming phase differential between the first comparative incoming signal and the second comparative incoming signal. As a result, when there is a physical length differential between the optical paths from the signal-directing component 18 to the processing components, the electronics can operate the first phase shifter 86 and/or a second phase shifter 88 so as to provide the desired effective optical pathlengths. Suitable phase shifters include, but are not limited to, PIN diodes, thermal heaters, and ring resonators.

Although not illustrated, a phase shifter can optionally be positioned along the first shift waveguide 48 and/or the second shift waveguide 50. One or both phase shifters can be tuned so as to retain the desired phase differential between the phase of the first portion of the reference signal at the end of the first shift waveguide 48 and the phase of the second portion of the reference signal at the end of the second shift waveguide 50. In some instances, the electronics operate the phase shifters so as to retain the desired incoming phase differential of $k*2*\pi$ where k is an integer that can be zero, negative, or positive. In this configuration, there is not a phase differential between the first portion of the reference signal at the end of the first shift waveguide 48 and the phase of the second portion of the reference signal at the end of the second shift waveguide 50.

Figure 2:
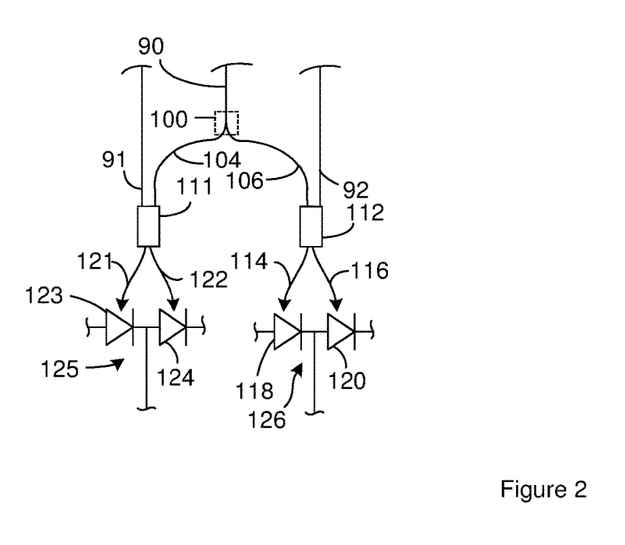
FIG. 2 includes a schematic of a processing unit and electronics suitable for use with the LIDAR chip of FIG. 1.

FIG. 2 is a schematic of an example of a suitable processing component in communication with a portion of the electronics. The illustrated processing component can represent the first processing component 55 and/or the second processing component 56 of FIG. 1. The illustrated processing component includes a comparative waveguide 90, a reference waveguide 91, and a secondary reference waveguide 92. The comparative waveguide 90 can represent the first comparative signal waveguide 69 while the reference waveguide 91 represents the first reference waveguide 53, and the secondary reference waveguide 92 represents the first secondary reference waveguide 58, or the comparative waveguide 90 can represent the second comparative signal waveguide 66 while the reference waveguide 91 represents the second reference waveguide 54, and the secondary reference waveguide 92 represents the second secondary reference waveguide 59.

For illustrative purposes, the following description of FIG. 2 is in the context of the comparative waveguide 90 representing the first comparative signal waveguide 69, the reference waveguide 91 representing the first reference waveguide 53, and the secondary reference waveguide 92 representing the first secondary reference waveguide 58. The reference waveguide 91 carries the first reference signal to a light-combining component 111. The secondary reference waveguide 92 carries the first secondary reference signal to a second light-combining component 112. An example of a suitable light-combining component is a Multi-Mode Interference (MMI) device such as a 2×2 MMI device. Other suitable light-combining components include, but are not limited to, adiabatic splitters, and directional coupler. The functions of the illustrated light-combining component can be performed by more than one optical component. An example of a suitable second light-combining component is a Multi-Mode Interference (MMI) device such as a 2×2 MMI device. Other suitable second light-combining components include, but are not limited to, adiabatic splitters, and directional coupler. The functions of the illustrated second light-combining component can be performed by more than one optical component.

A second splitter 100 divides the comparative signal carried on the comparative waveguide 90 onto a first comparative waveguide 104 and a second comparative waveguide 106. The first comparative waveguide 104 carries a first portion of the comparative signal to the light-combining component 111. The second comparative waveguide 106 carries a second portion of the comparative signal to the second light-combining component 112.

The second light-combining component 112 combines the second portion of the comparative signal and the first secondary reference signal into a second composite signal. As a result, the second composite signal includes a contribution from the LIDAR input signal and also includes a contribution from a portion of the outgoing LIDAR signal that has not exited from the LIDAR system. Accordingly, the second composite signal includes a contribution from a portion of the outgoing LIDAR signal that has exited from the LIDAR system and also from a portion of the outgoing LIDAR signal that has not exited from the LIDAR system. Since the second comparative signal is associated with the second polarization state, the second composite signal is also associated with the second polarization state. Due to the difference in frequencies between the second portion of the comparative signal and the first secondary reference signal, the second composite signal is beating between the second portion of the comparative signal and the first secondary reference signal. The light-combining component 112 also splits the resulting second composite signal onto a first auxiliary detector waveguide 114 and a second auxiliary detector waveguide 116.

The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first light-combining component 111 combines the first portion of the comparative signal and the first reference signal into a first composite signal. As a result, the first composite signal includes a contribution from the LIDAR input signal and also includes a contribution from a portion of the outgoing LIDAR signal that has not exited from the LIDAR system. Accordingly, the first composite signal includes a contribution from a portion of the outgoing LIDAR signal that has exited from the LIDAR system and also from a portion of the outgoing LIDAR signal that has not exited from the LIDAR system. Since the first comparative signal is associated with the first polarization state, the first composite signal is also associated with the first polarization state. Due to the difference in frequencies between the first portion of the comparative signal and the first reference signal, the first composite signal is beating between the first portion of the comparative signal and the first reference signal. The light-combining component 111 also splits the first composite signal onto a first detector waveguide 121 and a second detector waveguide 122.

The optical pathlength provided by the first comparative waveguide 104 and the second comparative waveguide 106 can be the same or can be different by n*λ where λ is the wavelength of the LIDAR output signal and n is an integer that can be zero, positive, or negative. As a result, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first detector waveguide 121 carries a first portion of the first composite signal to a first light sensor 123 that converts the first portion of the second composite signal to a first electrical signal. The second detector waveguide 122 carries a second portion of the second composite signal to a second auxiliary light sensor 124 that converts the second portion of the second composite signal to a second electrical signal. Examples of suitable light sensors include germanium photodiodes (PDs), and avalanche photodiodes (APDs).

The first light sensor 123 and the second light sensor 124 are connected as a balanced detector 125 that outputs a first data signal that is also an electrical composite signal. Additionally, the first auxiliary light sensor 118 and the second auxiliary light sensor 120 are connected as a balanced detector 126 that outputs a second data signal that is also an electrical composite signal. The first data signal is an in-phase component of a complex data signal and the second data signal is the quadrature component of the complex data signal.

Figure 3:
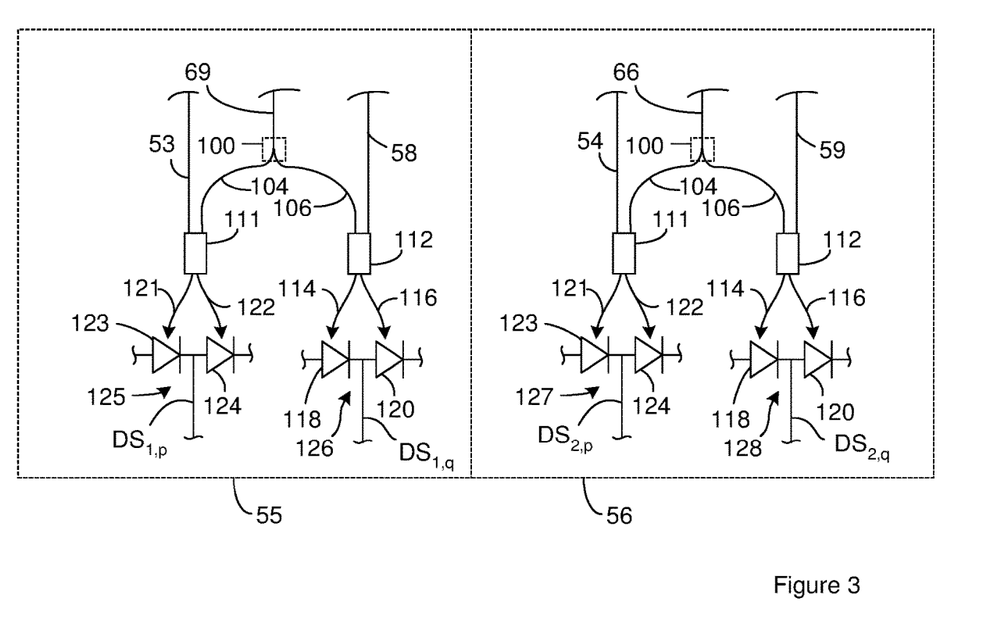
FIG. 3 includes a schematic of multiple different processing units and electronics constructed according to FIG. 2 and their respective outputs when used in conjunction with the LIDAR chip of FIG. 1.

FIG. 3 is a schematic showing the relationship between processing components constructed according to FIG. 2 and the LIDAR chip of FIG. 1. One of the processing components constructed according to FIG. 2 serves as the first processing component 55 shown in FIG. 1 and another processing component constructed according to FIG. 2 serves as the second processing component 56 shown in FIG. 1. In the first processing component 55, the first comparative signal waveguide 69, the first reference waveguide 53, and the first secondary reference waveguide 58 from FIG. 1 respectively serve as the comparative waveguide 90, the reference waveguide 91, and the secondary reference waveguide 92 of FIG. 2. In the second processing component 56, the second comparative signal waveguide 66, the second reference waveguide 54, and the second secondary reference waveguide 59 from FIG. 1 respectively serve as the comparative waveguide 90, the reference waveguide 91, and the secondary reference waveguide 92 of FIG. 2.

The first processing component 55 has the first light sensor 123 and the second light sensor 124 connected as the balanced detector 125 while the first auxiliary light sensor 118 and the second auxiliary light sensor 120 are connected as the balanced detector 126. The second processing component 56 has the first light sensor 123 and the second light sensor 124 connected as a balanced detector 127 while the first auxiliary light sensor 118 and the second auxiliary light sensor 120 are connected as a balanced detector 128.

As noted above, the first data signal is an in-phase component of a complex data signal and the second data signal is the quadrature component of the complex data signal. Accordingly, the first processing component 55 outputs a first complex data signal and the second processing component 56 outputs a second complex data signal. In the first processing component 55, the first data signal is the in-phase component of the first complex data signal and the second data signal is the quadrature component of the first complex data signal. In the second processing component 56, the first data signal is the in-phase component of the first complex data signal and the second data signal is the quadrature component of the first complex data signal.

The first complex data signal and the second complex data signals are each associated with a different polarization state. For instance, as noted above, the first comparative signal and the second comparative signal are associated with different polarization states because the first comparative signal carries the LIDAR data from the portion of the LIDAR input signal having the first polarization state and the second comparative signal carries the LIDAR data from the portion of the LIDAR input signal having the second polarization state. As a result, the first data signal and the second data signal output from the first processing component 55 (the first complex data signal) are associated with the first polarization state while the first data signal and the second data signal output from the second processing component 56 (the second complex data signal) are associated with the second polarization state. Accordingly, each of the data signals is associated with a polarization state and is either an in-phase component or a quadrature component of a complex data signal. In order to illustrate this, each of the data signals is labeled $DS_{i,j}$ in FIG. 3, where i=1 represents the first polarization state, i=2 represents the second polarization state, j=p represents the in-phase component, and j=q represents the quadrature component.

In FIG. 3, the optical pathlengths of the first reference waveguide 53 from the first processing component 55, the first secondary reference waveguide 58 from the first processing component 55, the first secondary reference waveguide 54 from the second processing component 56, and the second secondary reference waveguide 59 from the second processing component 56 are disclosed in the context of FIG. 1. For instance, as noted in the context of FIG. 1, the length of the first shift waveguide 48, second shift waveguide 50, first reference waveguide 53, the second reference waveguide 54, the first secondary reference waveguide 58 and the second secondary reference waveguide 59 can be selected to provide the desired first phase shift and the desired second phase shift.

Figure 4:
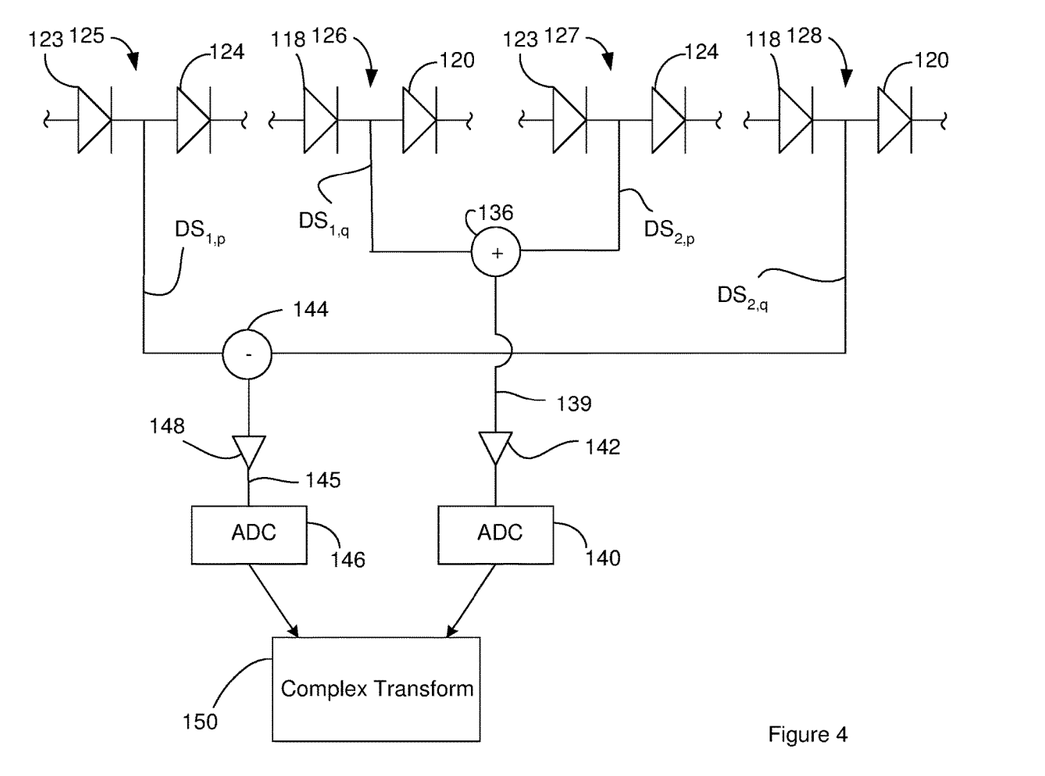
FIG. 4 is a schematic showing additional details of the electronics in communication with the processing components of FIG. 3.

FIG. 4 is a schematic showing additional details of the electronics in communication with the first processing component 55 and the second processing component 56 of FIG. 3. The electronics include lines that carry the data signal $DS_{1,q}$ and the data signal $DS_{2,p}$ to an adder 136 that sums the data signal $DS_{1,q}$ and the data signal $DS_{2,p}$. Accordingly, the quadrature data signal associated with the first polarization state is added with the in-phase data signal associated with the second polarization state. The result of the summation is a quadrature component of a complex LIDAR data signal that is output by the adder 136. Suitable adders include, but are not limited to, RF combiners including resistive or hybrid combiners.

The electronics include a first line 139 that carries the quadrature component of the LIDAR data signal to an Analog-to-Digital Converter (ADC) 140. The Analog-to-Digital Converter (ADC) 140 converts the quadrature component of the LIDAR data signal from an analog form to digital form and outputs the result as a digital quadrature component of the LIDAR data signal. An amplifier 142 can optionally be positioned along the first line 139 so as to amplify the quadrature component of the LIDAR data signal. Suitable amplifiers include, but are not limited to, Transimpedance Amplifiers (TIAs).

The electronics include lines that carry the data signal $DS_{1,p}$ and the data signal $DS_{2,q}$ to a subtractor 142 configured to subtract the data signal $DS_{2,q}$ from the data signal $DS_{1,p}$ ($DS_{1,p} - DS_{2,q}$). Accordingly, the quadrature data signal associated with the second polarization state is subtracted from the in-phase data signal associated with the first polarization state. The result is an in-phase component of the LIDAR data signal that is output from the subtractor. Suitable subtractors 142 include, but are not limited to, high frequency operational amplifier-based subtractors.

The electronics include a second line 145 that carries the in-phase component of the LIDAR data signal to an Analog-to-Digital Converter (ADC) 146. The Analog-to-Digital Converter (ADC) 146 converts the in-phase component of the LIDAR data signal from an analog form to digital form and outputs the result as a digital in-phase component of the LIDAR data signal. An amplifier 148 can optionally be positioned along the second line 145 so as to amplify the in-phase component of the LIDAR data signal. Suitable amplifiers 148 include, but are not limited to, Transimpedance Amplifiers (TIAs).

The quadrature component of the LIDAR data signal and the in-phase component of the LIDAR data signal are provided to a transform component 150 configured to perform a complex transform on the complex LIDAR data signal so as to convert the input from the time domain to the frequency domain. The transform module can execute the attributed functions using firmware, hardware and software or a combination thereof. Accordingly, the transform module can output one or more frequencies that each corresponds to an object in the sample region illuminated by the LIDAR output signal. Different reflecting objects in a sample region need not be physically separate items but can be different surfaces of the same item that are located different distances from the LIDAR system and/or are moving at different radial velocities relative to the LIDAR system as might occur with a jagged object that is both rotating and translating relative to the LIDAR system. Each of the different frequencies output from the transform is used by the electronics as a frequency associated with a LIDAR input signal that is a result of a different object being present in the sample region. As a result, the electronics can use the frequencies for further processing to determine the distance and/or radial velocity between the LIDAR system and each of the one or more reflecting objects in the sample region.

During operation of the LIDAR system, the generation of LIDAR data is divided into a series of cycles where LIDAR data is generated for each cycle. Each LIDAR data result can be associated with a sample region in the field of view in that the resulting LIDAR data is the LIDAR data for one or more object located in that sample region. In some instances, the LIDAR output signal is directed to different sample regions in different cycles. As a result, the LIDAR data generated during different cycles can be associated with different sample regions.

The cycles can be performed such that the duration of each cycle can be divided into different time periods. For instance, the duration of a cycle can include one or more data periods where the LIDAR input signals are generated and received at the LIDAR chip and one or more re-location periods where the LIDAR output signal is moved from one sample region to another sample region. In a continuous scan mode, the cycle does not include any re-location periods and the LIDAR output signal is moved continuously.

Figure 5:
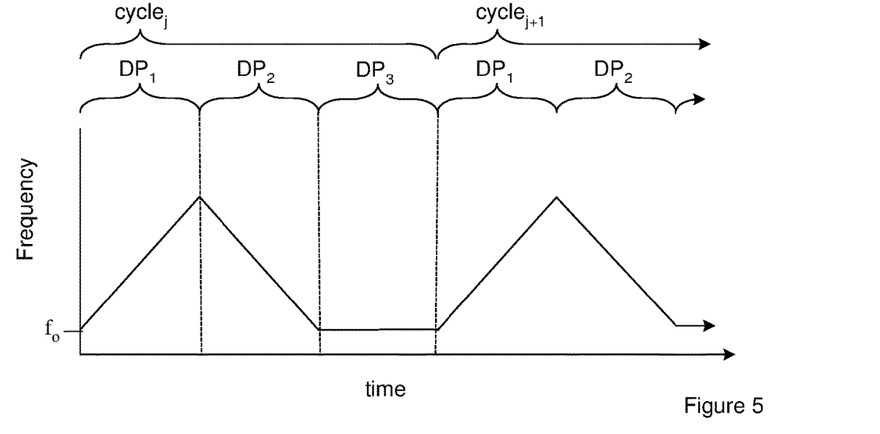
FIG. 5 is a graph showing frequency of a LIDAR output signal output by the LIDAR system as a function of time.

FIG. 5 shows an example of a relationship between the frequency of the LIDAR output signal, time, cycles and the data periods. The base frequency of the LIDAR output signal ($f_o$) can be the frequency of the LIDAR output signal at the start of a cycle.

FIG. 5 shows frequency versus time for a sequence of two cycles labeled $cycle_j$ and $cycle_{j+i}$. In some instances, the frequency versus time pattern is repeated in each cycle as shown in FIG. 5. The illustrated cycles do not include re-location periods and/or re-location periods are not located between cycles. As a result, FIG. 5 illustrates the results for a continuous scan.

Each cycle includes K data periods that are each associated with a period index k and are labeled $DP_k$. In the example of FIG. 5, each cycle includes three data periods labeled $DP_k$ with k=1, 2, and 3. In some instances, the frequency versus time pattern is the same for the data periods that correspond to each other in different cycles as is shown in FIG. 5. Corresponding data periods are data periods with the same period index. As a result, each data period $DP_1$ can be considered corresponding data periods and the associated frequency versus time patterns are the same in FIG. 5. At the end of a cycle, the electronics return the frequency to the same frequency level at which it started the previous cycle.

During the data period $DP_1$, and the data period $DP_2$, the electronics operate the light source such that the frequency of the LIDAR output signal changes at a linear rate $\alpha$. The direction of the frequency change during the data period $DP_1$ is the opposite of the direction of the frequency change during the data period $DP_2$.

The frequency output from the Complex Fourier transform represents the beat frequency of the composite signals that each includes a comparative signal beating against a reference signal. The beat frequencies ($f_{LDP}$) from two or more different data periods can be combined to generate the LIDAR data. For instance, the beat frequency determined from $DP_1$ in FIG. 5 can be combined with the beat frequency determined from $DP_2$ in FIG. 5 to determine the LIDAR data. As an example, the following equation applies during a data period where electronics increase the frequency of the outgoing LIDAR signal during the data period such as occurs in data period $DP_1$ of FIG. 5: $f_{ub} = -f_d + \alpha\tau$ where $f_{ub}$ is the frequency provided by the transform module ($f_{LDP}$ determined from $DP_1$ in this case), $f_d$ represents the Doppler shift ($f_d = 2vf_c/c$) where $f_c$ represents the optical frequency ($f_o$), c represents the speed of light, v is the radial velocity between the reflecting object and the LIDAR system where the direction from the reflecting object toward the chip is assumed to be the positive direction, and c is the speed of light. The following equation applies during a data period where electronics decrease the frequency of the outgoing LIDAR signal such as occurs in data period $DP_2$ of FIG. 5: $f_{db} = -f_d - \alpha\tau$ where $f_{db}$ is a frequency provided by the transform module ($f_{i,LDP}$ determined from $DP_2$ in this case). In these two equations, $f_d$ and $\tau$ are unknowns. The electronics solve these two equations for the two unknowns. The radial velocity for the sample region then be determined from the Doppler shift ($v = c*f_d/(2f_c)$) and/or the separation distance for that sample region can be determined from $c*f_d/2$. Since the LIDAR data can be generated for each corresponding frequency pair output by the transform, separate LIDAR data can be generated for each of the objects in a sample region. Accordingly, the electronics can determine more than one radial velocity and/or more than one radial separation distance from a single sampling of a single sample region in the field of view.

The data period labeled $DP_3$ in FIG. 5 is optional. As noted above, there are situations where more than one object is present in a sample region. For instance, during the feedback period in $DP_1$ for $cycle_2$ and also during the feedback period in $DP_2$ for $cycle_2$, more than one frequency pair can be matched. In these circumstances, it may not be clear which frequencies from $DP_2$ correspond to which frequencies from $DP_1$. As a result, it may be unclear which frequencies need to be used together to generate the LIDAR data for an object in the sample region. As a result, there can be a need to identify corresponding frequencies. The identification of corresponding frequencies can performed such that the corresponding frequencies are frequencies from the same reflecting object within a sample region. The data period labeled $DP_3$ can be used to find the corresponding frequencies. LIDAR data can be generated for each pair of corresponding frequencies and is considered and/or processed as the LIDAR data for the different reflecting objects in the sample region.

An example of the identification of corresponding frequencies uses a LIDAR system where the cycles include three data periods ($DP_1$, $DP_2$, and $DP_3$) as shown in FIG. 5. When there are two objects in a sample region illuminated by the LIDAR outputs signal, the transform module outputs two different frequencies for $f_{ub}$: $f_{u1}$ and $f_{u2}$ during $DP_1$ and another two different frequencies for $f_{db}$: $f_{d1}$ and $f_{d2}$ during $DP_2$. In this instance, the possible frequency pairings are: $(f_{d1}, f_{u1})$; $(f^{d1}, f_{u2})$; $(f_{d2}, f_{u1})$; and $(f_{d2}, f_{du2})$. A value of $f_d$ and $\tau$ can be calculated for each of the possible frequency pairings. Each pair of values for $f_d$ and $\tau$ can be substituted into $f_3 = -f_d + \alpha_3\tau_0$ to generate a theoretical $f_3$ for each of the possible frequency pairings. The value of $\alpha_3$ is different from the value of $\alpha$ used in $DP_1$ and $DP_2$. In FIG. 5, the value of $\alpha_3$ is zero. In this case, the transform modules 150 also outputs two values for $f_3$ that are each associated with one of the object in the sample region. The frequency pair with a theoretical $f_3$ value closest to each of the actual $f_3$ values is considered a corresponding pair. LIDAR data can be generated for each of the corresponding pairs as described above and is considered and/or processed as the LIDAR data for a different one of the reflecting objects in the sample region.

Each set of corresponding frequencies can be used in the above equations to generate LIDAR data. The generated LIDAR data will be for one of the objects in the sample region. As a result, multiple different LIDAR data values can be generated for a sample region where each of the different LIDAR data values corresponds to a different one of the objects in the sample region.

Figure 6:
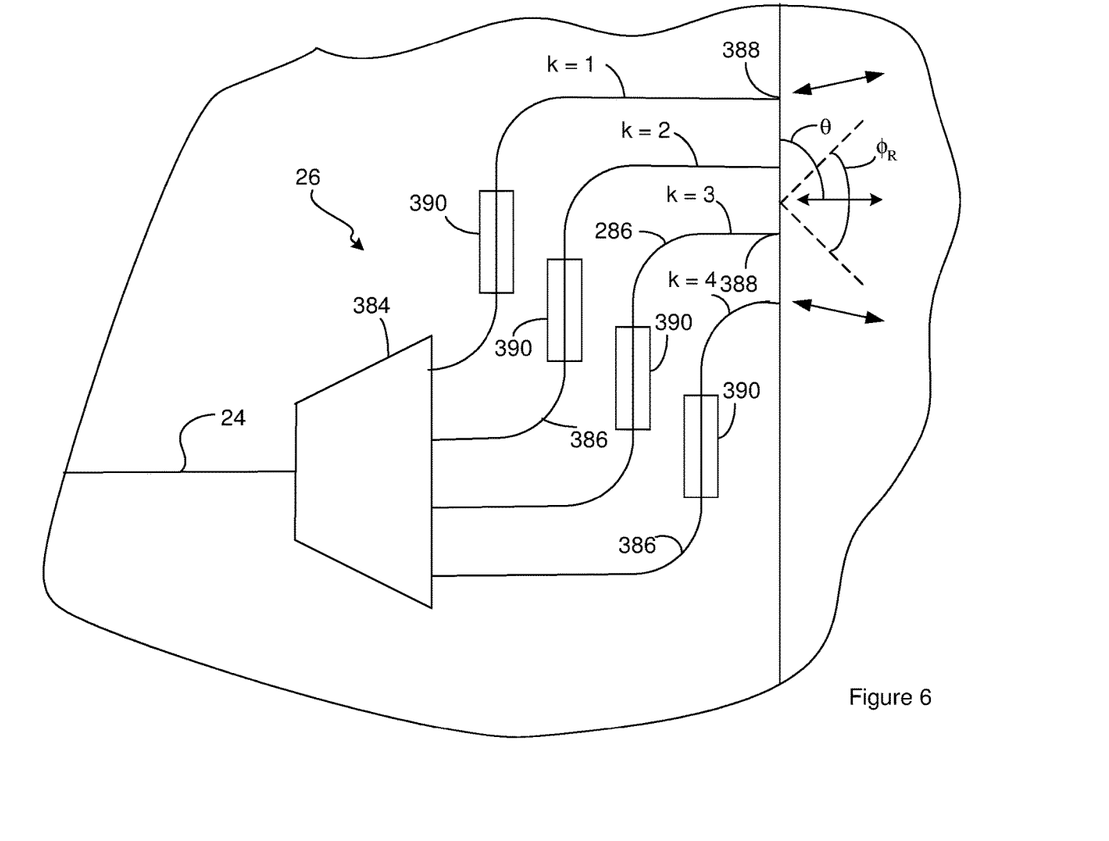
FIG. 6 is an example of an output component suitable for use with the LIDAR chip of FIG. 1.

Suitable output components 26 can be facets, OPAs, and steering mirrors. FIG. 6 illustrates an example of a suitable output component 26 that can optionally include beam steering capability. The output component 26 includes a splitter 384 that receives the outgoing light signal from the LIDAR signal waveguide 24. The splitter 384 divides the outgoing light signal into multiple output signals that are each carried on a steering waveguide 386. Each of the steering waveguides ends at a facet 388. The facets are arranged such that the output signals exiting the LIDAR chip through the 388 facets combine to form the LIDAR output signals.

The splitter 384 and steering waveguides 386 can be constructed such that there is not a phase differential between output signals at the facet of adjacent steering waveguides. For instance, the splitter can be constructed such that each of the output signals is in-phase upon exiting from the splitter and the steering waveguides can each have the same length. Suitable numbers of steering waveguides 386 (M) include, but are not limited to, M greater than 10, or 500 and/or less than 1000, or 2000. Suitable splitters include, but are not limited to, star couplers, cascaded Y-junctions and cascaded 1×2 MMI couplers.

In some instances, a phase tuner 390 is optionally positioned along at least a portion of the steering waveguides. Although a phase tuner is shown positioned along the first steering waveguide and the last steering waveguide, one or both of these phase tuners are optional. For instance, the output component 26 need not include a phase tuner on steering waveguide k=1.

The electronics can be configured to operate the phase tuners 390 so as to create a phase differential between the output signals at the facet of adjacent steering waveguides 386. The electronics can operate the phase tuners 390 such that the phase differential is constant in that it increases linearly across the steering waveguides. For instance, electronics can operate the phase tuners such that the tuner-induced phase of steering waveguide number k is (k−1) β where k is an integer from 1 to M and represents the number associated with a steering waveguide when the steering waveguides are sequentially numbered as shown in FIG. 6, β is the tuner-induced phase differential between neighboring steering waveguides. Accordingly, the phase of steering waveguide number k is $f_o + (k-1)f + (k-1)\beta$. FIG. 6 illustrates the chip having only 4 steering waveguides in order to simplify the illustration, however, the chip can include more steering waveguides. For instance, the chip can include more than 4 steering waveguides, more than 100 steering waveguides, or more than 1000 steering waveguides and/or less than 10000 steering waveguides.

The electronics can be configured to operate the phase tuners 390 so as to tune the value of the phase differential β. Tuning the value of the phase differential β changes the direction that the LIDAR output signals travel away from the chip (θ). Accordingly, the electronics can scan the LIDAR output signals by changing the phase differential α.

The range of angles over which the LIDAR output signal can be scanned is $\phi_R$ and, in some instances, extends from $\phi_v$ to $-\phi_v$ with $\phi=0°$ being measured in the direction of the LIDAR output signal when $\beta=0$.

In addition to creating the phase differential or as an alternative to creating the phase differential, the phase tuners 390 can be operated so as to collimate or focus the LIDAR output signals. For instance, the phase tuners 390 can be operated such that there is a constant phase differential $\beta$ induced between the successive waveguides so that the induced phase for waveguide k is $\varphi_k=(k-1)\beta$, where $\beta$ is a constant in the case a collimated beam. For a focused beam, as suitable nonlinear phase dependence can be induced.

Additional details about the construction and operation of a output component 26 constructed according to FIG. 6 can be found in U.S. Provisional Patent Application Ser. No. 62/680,787, filed on Jun. 5, 2018, and incorporated herein in its entirety. There may be some spreading of the different LIDAR output signals in the outgoing LIDAR signal as they travel away from the output component 26. Because the LIDAR output signals are directed to the same sample region, the degree of separation can be such that the spot size of each of the LIDAR output signals is overlapped by at least one of the other LIDAR output signals by more than an overlap threshold percentage at the maximum distance for which the LIDAR system is configured to provide LIDAR data. As noted above, the maximum distance is commonly set by the specifications of the application to which the LIDAR system is being applied. An example of circumstances where there may be some spreading of the different LIDAR output signals in the outgoing LIDAR signal as they travel away from the output component 26 is when the path length difference between steering waveguide 386 is non-zero.

Figure 7:
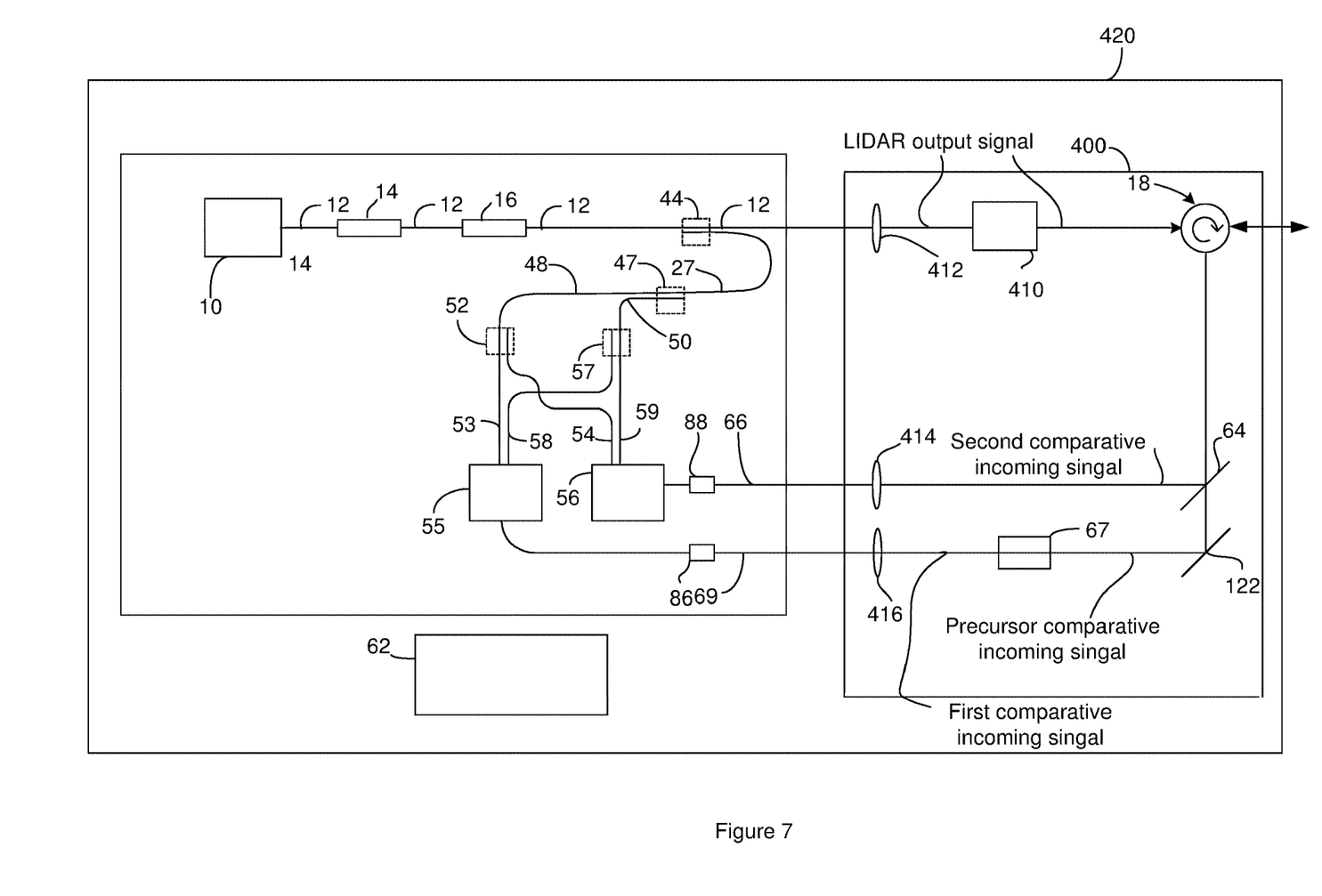
FIG. 7 is a schematic of another example of a LIDAR chip suitable for use in a LIDAR system.

A portion of the components on the LIDAR chip can be located off the LIDAR chip. As an example, FIG. 7 is a topview of a LIDAR system that includes a LIDAR chip, the electronics 62, and a LIDAR adapter on a common support 420. Although the electronics 62 are illustrated as being located on the common support 420, all or a portion of the electronics can be located off the common support. Suitable approaches for mounting the LIDAR chip, electronics, and/or the LIDAR adapter on the common support include, but are not limited to, epoxy, solder, and mechanical clamping. Suitable common supports 420 include, but are not limited to, glass plates, metal plates, silicon plates and ceramic plates.

The LIDAR adapter that includes multiple active and/or passive components positioned on a base. For instance, FIG. 7 shows a portion of the components from the LIDAR chip of FIG. 1 included in the LIDAR adapter. The LIDAR adapter includes the signal-directing component 18, the beamsplitter 64, and the polarization rotator 67 located on a base 400. The illustrated signal-directing component 18 is an optical circulator 100 that includes three ports and is configured such that light entering one port exits from the next port.

The LIDAR output signal output from the LIDAR chip enters the first port 104 from the utility waveguide 12 of the LIDAR chip and exits from a second port. The LIDAR adapter can be configured such that the output of the LIDAR output signal from the second port serves as the output of the LIDAR output signal from the LIDAR system. As a result, the LIDAR output signal can be output from the LIDAR adapter such that the LIDAR output signal is traveling toward a sample region in the field of view.

The LIDAR output signal output from the LIDAR system includes, consists of, or consists essentially of light from the LIDAR output signal received from the LIDAR chip. Accordingly, the LIDAR output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter.

When an object in the sample region reflects the LIDAR output signal, at least a portion of the reflected light travels back to the circulator as the LIDAR input signal. The LIDAR return signal enters the circulator through the second port. FIG. 6 illustrates the LIDAR output signal and the LIDAR input signal traveling between the LIDAR adapter and the sample region along the same optical path.

The LIDAR input signal exits the circulator through the third port and is directed to the input waveguide 19 on the LIDAR chip. The LIDAR adapter includes the beamsplitter 64 configured to receive the LIDAR input signal from the circulator. The beamsplitter 64 splits the LIDAR return signal into the precursor comparative incoming signal the second comparative incoming signal. Suitable beamsplitters include, but are not limited to, Wollaston prisms, and MEMs-based beamsplitters.

The second comparative incoming signal is received on the second comparative signal waveguide 66 on the LIDAR chip. The second comparative signal waveguide 66 carries the second comparative incoming signal to the second processing component 56 where it is processed as described above. The precursor comparative incoming signal is directed to and received at the polarization rotator 67. The polarization rotator outputs a first comparative incoming signal that is received on the first comparative signal waveguide 69 on the LIDAR chip. The first comparative signal waveguide 69 carries the first comparative signal to the first processing component 55 where it is processed as described above.

As is evident from FIG. 7, the LIDAR adapter can include optical components in addition to the signal-directing component 18. For instance, the LIDAR adapter can include components for directing and controlling the optical path of the LIDAR output signal and the LIDAR return signal. As an example, the adapter of FIG. 7 includes an optional amplifier 410 positioned so as to receive and amplify the LIDAR output signal before the LIDAR output signal enters the signal-directing component 18. The amplifier 410 can be operated by the electronics 62 allowing the electronics 62 to control the power of the LIDAR output signal.

The LIDAR adapter can also include passive components. For instance, FIG. 7 also illustrates the LIDAR adapter including an optional first lens 412. The first lens 412 can be configured to couple the LIDAR output signal to a desired location. In some instances, the first lens 412 is configured to focus or collimate the LIDAR output signal at a desired location. In one example, the first lens 412 is configured to couple the LIDAR output signal on the signal-directing component 18 when the LIDAR adapter does not include an amplifier 410. As another example, when the LIDAR adapter includes an amplifier 410, the first lens 412 can be configured to couple the LIDAR output signal on the entry port to the amplifier 410.

FIG. 7 also illustrates the LIDAR adapter including an optional second lens 114. The second lens 114 can be configured to couple the LIDAR output signal at a desired location. In some instances, the second lens 114 is configured to focus or collimate the second comparative incoming signal at a desired location. For instance, the second lens 414 can be configured to couple the second comparative incoming signal on a facet of the second comparative signal waveguide 66.

FIG. 7 also illustrates the LIDAR adapter including an optional third lens 416. The third lens 416 can be configured to couple the first comparative incoming signal at a desired location. In some instances, the third lens 416 focuses or collimates the first comparative incoming signal at a desired location. For instance, the third lens 416 can be configured to focus or collimate the first comparative incoming signal on a facet of the first comparative signal waveguide 69.

The LIDAR adapter also includes one or more direction changing components 124 such as mirrors and prisms. FIG. 7 illustrates the LIDAR adapter including a mirror as a direction changing component 418 that redirects the precursor comparative incoming signal from the beamsplitter 64 to the polarization rotator 67 and/or to the third lens 416.

The LIDAR chips include one or more waveguides that constrains the optical path of one or more light signals. While the LIDAR adapter can include waveguides, the optical path that the LIDAR input signal and the LIDAR output signal travel between components on the LIDAR adapter and/or between the LIDAR chip and a component on the LIDAR adapter can be free space. For instance, the LIDAR input signal and/or the LIDAR output signal can travel through the atmosphere in which the LIDAR chip, the LIDAR adapter, and/or the base 400 is positioned when traveling between the different components on the LIDAR adapter and/or between a component on the LIDAR adapter and the LIDAR chip. As a result, optical components such as lenses and direction changing components can be employed to control the characteristics of the optical path traveled by the LIDAR return signal and the LIDAR output signal on, to, and from the LIDAR adapter.

Suitable bases 400 for the LIDAR adapter include, but are not limited to, substrates, platforms, and plates. Suitable substrates include, but are not limited to, glass, silicon, and ceramics. The components on the adapter can be discrete components that are attached to the substrate. Suitable techniques for attaching discrete components to the base 400 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

In some instances, the LIDAR adapter includes discrete components and the LIDAR chip includes components that are integrated on a platform such as a silicon-on-insulator wafer. As a result, components that are difficult, challenging, expensive, or impractical to integrate on a LIDAR chip can be placed on the LIDAR adapter. For instance, optical circulators have been ineffective in integrated platforms. As a result, the use of the LIDAR adapter allows the circulator to be effectively incorporated into the LIDAR system.

Construction and/or operation of a LIDAR system, LIDAR chip and/or LIDAR adapter according to FIG. 7 can be found in U.S. patent application Ser. No. 16/547,522, filed on Aug. 21, 2019, entitled "LIDAR Adapter for Use with LIDAR Chip," and incorporated herein in its entirety.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A system, comprising:
a LIDAR system configured to output a LIDAR output signal toward a sample region in a field of view, the LIDAR output signal including light from an outgoing LIDAR signal guided by the system,
the LIDAR system configured to receive a LIDAR input signal that has been reflected by an object located outside of the LIDAR system and within the sample region, the LIDAR input signal including light from the LIDAR output signal; and
the LIDAR system configured to combine contributions from different signals so as to generate composite signals that each carries LIDAR data that indicates a radial velocity and/or distance between the object and the LIDAR system,
each composite signal having a contribution from the LIDAR input signal and also having a contribution from a portion of the outgoing LIDAR signal that was not output from the LIDAR system,
each composite signal being associated with a polarization state in that the contribution of the LIDAR input signal to the composite signal was of the associated polarization state,
each composite signal being associated with a signal component of a complex signal in that each composite signal is a signal component selected from the group consisting of an in-phase component and a quadrature component, and
each of the composite signals being associated with a different combination of polarization state and signal component; and
electronics that combine the composite signals so as to generate an in-phase component of a complex LIDAR data signal and a quadrature component of the complex LIDAR data signal,
the electronics combining the composite signals such that two of the composite signals are added and one of the composite signals is subtracted from another one of the composite signals, and
the electronics configured to extract the LIDAR data from the complex LIDAR data signal.

2. The system of claim 1, wherein the LIDAR system generates at least four composite signals.

3. The system of claim 1, wherein the composite signals are optical signals.

4. The system of claim 1, wherein the composite signals are electrical signals.

5. The system of claim 1, wherein the complex LIDAR data signal is a digital signal.

6. The system of claim 1, wherein:
the electronics combine the composite signals such that a second one of the composite signals is added to a third one of the composite signals and a fourth one of the composite signals is subtracted from a first one of the composite signals.

7. The system of claim 6, wherein:
the first composite signals is associated with a first polarization state and is an in-phase component of a first complex data signal;
the second composite signals is associated with the first polarization state and is a quadrature component of the first complex data signal;

the third composite signals is associated with the second polarization state and is a quadrature component of a second complex data signal; and the fourth composite signals is associated with the second polarization state and is an in-phase component of a second complex data signal.

8. The system of claim 7, wherein the electronics combining the composite signals such that two of the composite signals are added and one of the composite signals is subtracted from another one of the composite signals includes the electronics adding the second composite signal and the third composite signal and subtracting the fourth composite signal from the first composite signal, the quadrature component of the complex LIDAR data signal results from the electronics adding the second composite signal and the third composite signal; and the in-phase component of the complex LIDAR data signal resulting from the electronics subtracting the fourth composite signal from the first composite signal.

9. The system of claim 8, wherein the electronics include a complex Fourier transform that receives the complex LIDAR data signal.

10. A method of operating a LIDAR system, comprising:

outputting a LIDAR output signal from a LIDAR system and toward a sample region in a field of view, the LIDAR output signal including light from an outgoing LIDAR signal guided by the system;

receiving a LIDAR input signal that has been reflected by an object located outside of the LIDAR system and within the sample region, the LIDAR input signal including light from the LIDAR output signal;

combining contributions from different signals so as to generate composite signals that each carries LIDAR data that indicates a radial velocity and/or distance between the object and the LIDAR system, each composite signal having a contribution from the LIDAR input signal and also having a contribution from a portion of the outgoing LIDAR signal that was not output from the LIDAR system, each composite signal being associated with a polarization state in that the contribution of the LIDAR input signal to the composite signal was of the associated polarization state, each composite signal being associated with a signal component of a complex signal in that each composite signal is a signal component selected from the group consisting of an in-phase component and a quadrature component, and each of the composite signals being associated with a different combination of polarization state and signal component;

combining the composite signals so as to generate an in-phase component of a complex LIDAR data signal and a quadrature component on the LIDAR data signal; and extracting the LIDAR data from the complex LIDAR data signal, wherein the composite signals are combined such that two of the composite signals are added and one of the composite signals is subtracted from another one of the composite signals.

11. The method of claim 10, wherein at least four composite signals are generated.

12. The method of claim 10, wherein the composite signals are optical signals.

13. The method of claim 10, wherein the composite signals are electrical signals.

14. The method of claim 10, wherein the composite signals are combined such that a second one of the composite signals is added to a third one of the composite signals and a fourth one of the composite signals is subtracted from a first one of the composite signals.

15. The method of claim 14, wherein:

the first composite signals is associated with a first polarization state and is an in-phase component of a first complex data signal;

the second composite signals is associated with the first polarization state and is a quadrature component of the first complex data signal;

the third composite signals is associated with the second polarization state and is a quadrature component of a second complex data signal; and the fourth composite signals is associated with the second polarization state and is an in-phase component of the second complex data signal.

16. The method of claim 15, wherein the quadrature component of the complex LIDAR data signal results from adding the second composite signal and the third composite signal and the in-phase component of the complex LIDAR data signal results from subtracting the fourth composite signal from the first composite signal.

17. The system of claim 7, wherein the quadrature component of the complex LIDAR data signal results from the electronics adding the two composite signals and the in-phase component of the complex LIDAR data signal results from the electronics subtracting one of the composite signals from another one of the composite signals.

18. The method of claim 10, wherein the quadrature component of the complex LIDAR data signal results from the addition the two composite signals and the in-phase component of the complex LIDAR data signal results from the subtraction of one of the composite signals from another one of the composite signals.

* * * * *